Patented Aug. 28, 1945

2,383,629

UNITED STATES PATENT OFFICE 2,383,629

PROCESS OF TREATING WAXES

Cyril S. Treacy, Scarsdale, N. Y., assignor to Mamaroneck Chemical Corporation, Westchester County, N. Y., a corporation of New York No Drawing. Application November 21, 1941, Serial No. 419,981

9 Claims. (Cl. 260—423)

This invention relates in general to waxes and in particular to a process for the purification of waxes and to correlated improvements designed to enhance the properties and to extend the field of use of such substances.

Many waxes, in particular vegetable waxes and animal waxes, are characterized by containing impurities which tend to lower the melting point, increase the tackiness, and impart objectionable odors and color to such waxes. Many of the impurities contained in such waxes cannot be removed by mere filtration or fractional crystallization and it is not always practical nor economical to attempt to improve the color of such waxes by mechanical filtration or absorption in activated materials such as fuller's earth. Moreover, a number of important uses of waxes necessitate that the wax have a high degree of transparency and this can only be accomplished by a bleaching operation.

It has been found that for highest efficiency the bleaching of wax should be carried out in aqueous emulsion. Heretofore the chief difficulty has been in breaking the emulsion after bleaching, this being especially difficult with hydrophilic waxes such as candelilla. Removing water from the emulsion by drying is a long and expensive operation.

Accordingly, it is a general object of the present invention to improve the physical appearance and attributes of vegetable and animal waxes, such as the transparency, color, tackiness and odor.

Another object of the present invention is to provide for a simple and rapid method of breaking an aqueous wax emulsion.

It is a specific object of the invention to provide a means for rapidly and efficiently moderating the impurities contained in vegetable and animal waxes so that they may be more readily separated from the wax.

Other objects of the invention will in part be obvious and will in part appear hereinafter.

According to the present invention, the chemical and physical properties of animal and vegetable waxes are improved by subjecting such waxes to the action of an acid bleaching agent comprising an oxygen-containing acid of chlorine, more particularly by melting the wax, adding an aqueous solution of an oxygen-containing acid of chlorine in small portions at a time, with vigorous stirring, to the molten wax whereby an emulsion is obtained, thereafter heating the emulsion until the impurities have been modified and the wax bleached, breaking the emulsion by producing crystals in situ within the emulsion whereupon the emulsion breaks into at least two layers, and separating the wax from the impurities.

The process of the present invention is adapted for improving the property of ester-type waxes selected from the classes consisting of vegetable waxes and animal waxes. Vegetable waxes as a class may be treated, such for example as candelilla wax, carnauba wax, flax wax, raphia wax, cotton seed wax, pisang wax, palm wax, and montan wax, and animal waxes as a class may be treated, such for example as beeswax, spermacetti, and the like. The vegetable and animal waxes differ from the mineral waxes in that the first two classes mentioned are characterized by comprising esters of the higher alcohols with higher fatty acids, whereas the mineral waxes are generally hydrocarbons and do not contain esters.

In carrying out the process there may be used an acid oxidizing agent comprising the oxygen-containing acids of chlorine as a class, of which there may be given as examples chloric acid, chlorous acid, perchloric acid and the like. Chloric acid is preferred in the present process because it is more stable and slower acting than the other chlorine acids, thereby enabling the process to be more easily controlled. Preferably, the chloric acid is produced by reacting a chlorate and a strong acid separately and then reacting the chloric acid with the wax. On the other hand, the chloric acid may be formed in situ by reaction of a soluble inorganic chlorate and an acid, such as sulfuric acid, nitric acid, formic acid and the like.

In the preparation of the emulsion, the wax is first melted and may with advantage be filtered to remove some of the impurities, and for this purpose the molten wax may be passed through a finely divided absorbent, such for example as activated diatomaceous earth, fuller's earth, activated carbon, silica gel, and the like. The bleaching agent in aqueous solution is poured into the molten wax in small portions at a time, with vigorous stirring, whereby an emulsion is formed.

The emulsion thus formed is then heated at an elevated temperature, preferably above the melting point of the wax, but not above the boiling point of the solution, and the heating continued for from one to several hours, with constant stirring. It appears that the heating of the wax in the presence of the acid oxidizing liquid causes a chemical change in the impurities, also renders the wax lighter in color, more transparent, less tacky, and removes objectionable odors.

In order to recover the wax from the emulsion, the emulsion is broken by forming in situ crystals of a water-insoluble substance. Preferably the crystals are produced by reacting within the emulsion sulfuric acid and a water-soluble salt of an alkaline earth metal, such for example as a water-soluble salt of barium, calcium, strontium and magnesium. If the solution has been rendered acid by the use of sulfuric acid, calcium chloride may be added, thus producing a precipitate of crystalline calcium sulphate. The crystals appear to assist in breaking the emulsion and in salting out the wax.

It is a characteristic of the emulsion that substantial quantities of heat are evolved during the breaking of the emulsion under certain conditions, and not under other conditions. For example, if the emulsion contains chloric acid and free sulfuric acid and there is then added a 50% aqueous solution of calcium chloride, a sharp temperature rise occurs. However, if before adding the calcium chloride solution, there is added to the emulsion a small quantity of hydrochloric acid, there will be no substantial temperature rise when the calcium chloride solution is added. If heat is not evolved during the salting out process, the system should be heated to hold the mixture at or near the boiling point for a few minutes. This temperature rise appears to assist in the separation of the system into layers. The emulsion may be caused to break without the formation of salt crystals in situ, by making the emulsion strongly acid as by adding sulfuric acid in excess of that required to liberate any oxidizing agent, such as the chloric acid. Thus after the bleaching has been completed, stirring is stopped and the system allowed to cool, whereupon if the emulsion is still acid in reaction, it will break.

Upon the breaking of the emulsion, the system will normally separate into at least two layers and in some cases into three layers. The lower layer will be an aqueous solution containing the salt used in salting out. The upper layer will comprise substantially only the clear purified wax. When large amounts of impurities are present, the upper and lower layers will be separated by a thin third layer comprising the impurities, which layer contains organic, slimy film-forming materials. The clear wax is decanted while molten or the system may be allowed to cool until the wax layer solidifies, whereupon such layer may be removed by hand and thus easily separated from the impurities. The wax may be filtered through absorbent material, such as fuller's earth, and thereafter pressed, granulated or otherwise processed as desired.

By way of illustrating but not by way of limiting the invention, there will be given the following specific examples:

*Example I*

400 grams of raw commercial candelilla wax are melted at 90° C. and there is added to the molten wax a solution comprising 24 grams of sodium chlorate, 240 cc. of water and 60 cc. of an aqueous solution of sulfuric acid (containing 14.8 grams of commercial 60° Bé. sulfuric acid), the solution being added in small portions with constant agitation over a period of one and a half hours. During this addition the temperature is maintained at 90° C. until about one half of the chlorate mixture has been added or until all evidences of a tendency to foam have disappeared. After this, the temperature may be safely raised to 95° C. After the addition of all the oxidizing solution, the temperature is held at 95-98° C. for one and a half to two hours, with constant stirring. During the addition of the oxidizing solution a fine grained emulsion is formed which assists the reaction by permitting close contact between wax particles and the aqueous phase. After completing the oxidation, the emulsion is cooled to 85° C. and a solution of 72 grams of calcium chloride in 90 cc. of water, also at a temperature of 85° C. is slowly added with stirring. Crystals of calcium sulfate soon appear; the color of the emulsion which has been a yellowish cream, now becomes a clearer, very light yellow, and the temperature of the emulsion rises to 95-100° C. or even slightly above this. Stirring is now stopped, the emulsion breaks and a top layer of quite clear, light yellow molten wax separates and may then be decanted. Care should be taken that the emulsion is not above 90° C. when the calcium chloride solution is added. Simultaneous with the calcium chloride solution, there may be added 10 parts of a 25% aqueous solution of sulfuric acid to assist in the formation of the calcium sulfate precipitate and it is also advantageous to hold the system at a gentle boil with slow stirring during the breaking of the emulsion. The latter operation appears to assist in the separation of the wax and in increasing the size of the separated salt crystals.

*Example II*

400 parts of candelilla wax are melted and there is added to the molten wax an aqueous solution containing 24 parts of sodium chlorate, 80 parts of a 25% aqueous solution of sulfuric acid (an excess) and 240 parts of water. The oxidizing solution is added with a stirring in small portions over a period of three hours while maintaining the system at 90-95° C., whereupon an emulsion is formed. The emulsion is then heated with constant stirring for an additional three hours at 95-100° C., whereupon the color becomes lighter. Upon cooling, the excess acid causes the emulsion to separate into two layers, an upper layer comprising a light yellow wax and a lower layer composed of a slimy hydrophilic emulsion. If the wax is filtered before bleaching as through bleaching earth, the emulsion will break in the presence of a smaller excess of sulfuric acid than if the wax is not pre-filtered. The acid is not employed in a way (amount, concentration, or other condition) which causes saponification of the wax esters. Hence the wax is in a chemically unaltered or raw condition in the emulsion at the time it is acted upon by the chloric acid.

*Example III*

400 grams of bees' wax are melted at 90° C. To this wax is added, at 90° C., with constant stirring, a solution of 24 g. of sodium chlorate dissolved in 240 cc. of water to which 60 cc. of 25% sulfuric acid has been added. Such addition is made slowly over a period of an hour and a half, whereupon an emulsion is formed. The emulsion is then stirred for an hour and a half or longer at 90-95° C. In view of the fact that beeswax is not substantially hydrophilic, separation of the wax from the acid emulsion occurs when stirring is stopped and the emulsion cooled.

It is to be understood that the invention is not limited to forming an emulsion of wax in water since it is possible to form a water-in-wax emulsion in which the wax forms the continuous phase and the water the dispersed phase.

When using chlorous acid as the oxidizing agent, it is advisable that the chlorous acid be formed in situ in the emulsion since it is not very stable. This may be done by preparing separately a solution of sodium chlorite and another solution of sulfuric acid, mixing the two solutions just prior to bringing the mixture into contact with the wax, or alternatively, one of the solutions may be added to the wax, after which the other solution is stirred into the emulsion.

As compared with the untreated wax, the bleached wax resulting from the above described process is characterized by having a higher melting point, a lighter color, a higher transparency, less tackiness and freedom from objectionable odors. It is thus seen that the present process improves both physical and chemical properties of the wax. Moreover, the separation of the wax from the impurities is greatly facilitated because the impurities are so modified by the process that upon breaking of the emulsion, the impurities separate from the wax, thus enabling the wax to be decanted and filtered in a simple and economical manner, which separation is not possible with the untreated wax.

In addition to the advantages of the process as above pointed out, the wax product appears to contain a very small amount of water, thus rendering it unnecessary to dry the wax so produced. Moreover, the separation of the purified wax from the impurities can be effected in a simple and economical manner; for example, after the emulsion is broken, the molten wax may be decanted or the system may be allowed to cool until the wax solidifies, thus enabling it to be merely lifted from the aqueous layer upon which it rests.

In a typical example of the process of the present invention wherein raw candelilla wax is treated with 6 per cent of sodium chlorate and sulfuric acid as disclosed in Example 2 the following results were obtained:

|  | Raw candelilla | Treated with 6% sodium chlorate |
| --- | --- | --- |
| Saponification number | 56.8 | 79.3 |
| Acid number | 21.6 | 25.0 |
| Ester number | 35.2 | 54.3 |
| Iodine number | 24.9 | 15.5 |
| Acetyl number | 29.1 | 16.8 |
| Melting point |  | (1) |

[1] Slight change.

From the above table, it will be observed that the saponification and ester numbers are substantially increased, the acid number is slightly increased, and the unsaturated bonds and alcoholic OH groups are substantially reduced. The chemical action therefore is not one involving saponification as its primary action, which action is employed in many prior proposed bleaching operations.

While various changes may be made in the process of the invention and various embodiments of the product produced, it is to be understood that the invention is not limited to the specific description herein given, and that scope of the invention will be indicated in the claims.

Having described my invention, what I desire to claim is:

1. The process of bleaching and improving the properties of candelilla wax which comprises chemically purifying the candelilla wax by substantially only the action of a hydrogen-chlorine-oxygen acid, said process involving emulsifying the candelilla wax and heating the same in the presence of said acid until the purification action is accomplished, breaking the emulsion, and separating the wax from the aqueous solution and impurities by settling.

2. The process of bleaching and improving the properties of candelilla wax which comprises emulsifying the candelilla wax in water by the action of emulsifying components contained in raw candelilla wax, said emulsification being effected by heating and agitating the wax in water, and purifying the wax by heating the same in the emulsified condition in the presence of a hydrogen-chlorine-oxygen acid in aqueous solution, and upon completion of the purification, separating the bleached wax from the aqueous solution and impurities.

3. The process of bleaching and improving the properties of candelilla wax which comprises heating the raw candelilla wax in emulsified condition in an aqueous solution of a hydrogen-chloride-oxygen acid until the wax is bleached and improved, breaking the emulsion by the action of a strong acid contained in the treated emulsion, and separating the wax from the aqueous solution and impurities.

4. The process for bleaching and improving the properties of candelilla wax which comprises emulsifying the candelilla wax in the presence of an aqueous solution of a hydrogen-oxygen-chlorine acid, heating the mass until the bleaching is accomplished and breaking the emulsion by the action of a strong mineral acid.

5. The process for bleaching and improving the properties of candelilla wax which comprises mixing with melted candelilla wax an aqueous solution consisting of water and a salt of a hydrogen-chlorine-oxygen acid and sulfuric acid in a quantity sufficient only to set free a hydrogen-chlorine-oxygen acid and leave therein an excess of sulfuric acid to break an emulsion to be formed, agitating the resulting mixture thereby forming an emulsion, heating the mass until the bleaching is accomplished, discontinuing the heating whereby the free acid breaks the emulsion, and separating the purified wax from the aqueous solution and the impurities.

6. The process for bleaching and improving the properties of candelilla wax which comprises chemically purifying the wax by substantially only the action of chloric acid in aqueous solution, the process involving subjecting the candelilla wax in emulsified substantially chemically unaltered condition to heating and when the purification is effected discontinuing the heating, breaking the emulsion by the action of sulfuric acid in the treated wax mass.

7. The process for bleaching and improving the properties of candelilla wax which comprises subjecting the candelilla wax while in emulsified and chemically unaltered condition to the action of an aqueous solution of a hydrogen-chlorine-oxygen acid until the purification is effected, and breaking the emulsion by forming water insoluble crystals in situ.

8. The process for bleaching and improving the properties of candelilla wax which comprises subjecting the candelilla wax in emulsified and chemically unaltered condition to the action of heat and an aqueous solution of a hydrogen-chlorine-oxygen acid until the purification is effected, and breaking the emulsion by forming in situ crystals of a water soluble salt of an alkaline earth metal.

9. The process for bleaching and improving the properties of candelilla wax consisting in heating raw candelilla wax while in emulsified condition in an aqueous solution of a hydrogen-chlorine-oxygen acid until the purification is effected, and breaking the emulsion by forming in situ crystals of calcium sulfate.

CYRIL S. TREACY.